Figure 1:
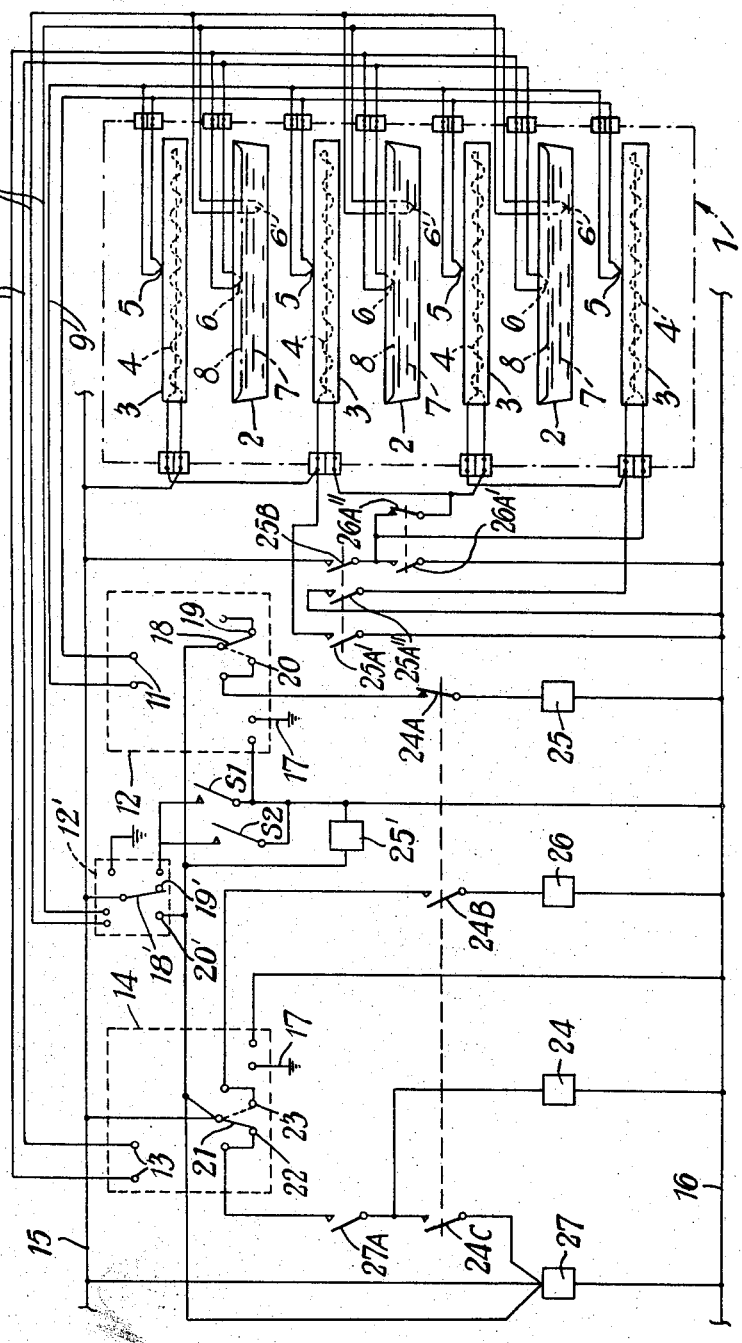

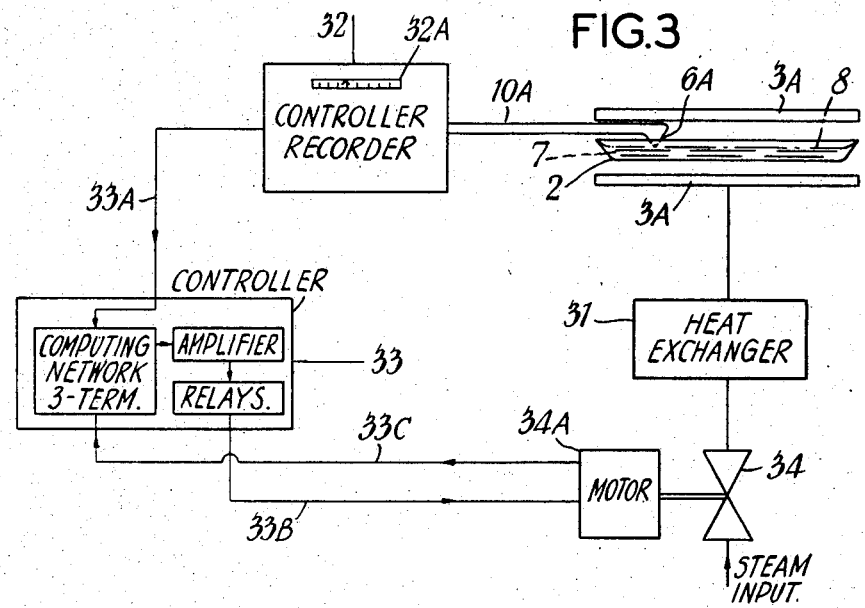
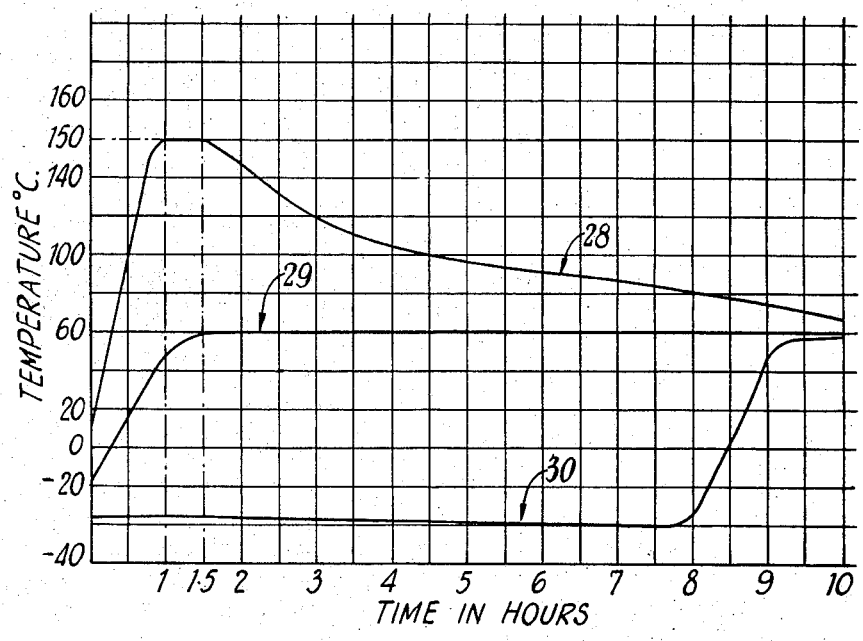

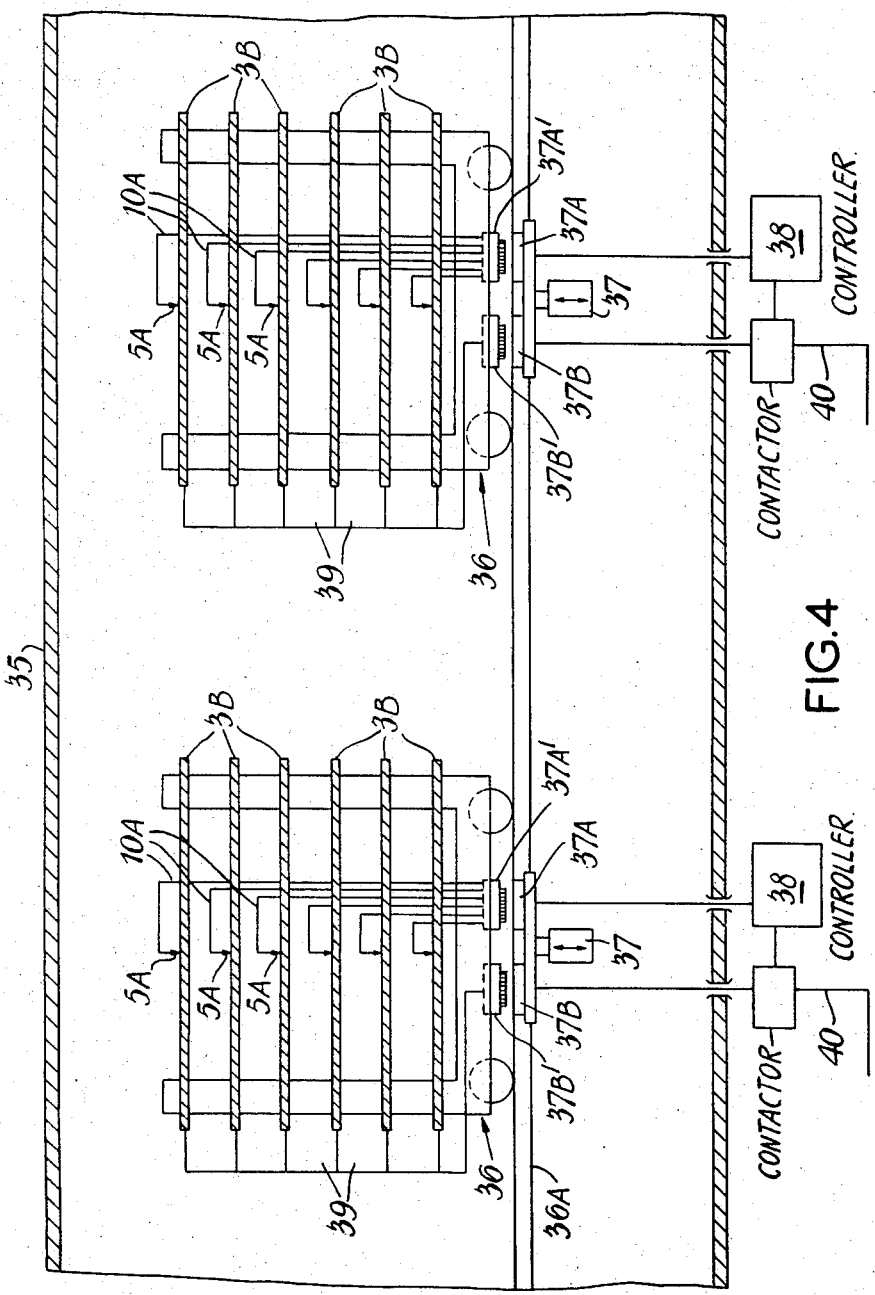

United States Patent Office 3,343,273
Patented Sept. 26, 1967

3,343,273
CONTROL APPARATUS IN EQUIPMENT FOR FREEZE-DRYING LIQUID, SEMI-LIQUID OR GRANULATED MATERIAL
Ronald Arthur James Ridge, Faringdon, England, assignor to Vickers-Armstrongs (Engineers) Limited, London, England, a British company
Filed Feb. 24, 1965, Ser. No. 434,796
Claims priority, application Great Britain, Feb. 26, 1964, 8,049/64
10 Claims. (Cl. 34—48)

This invention relates to control apparatus in equipment for freeze-drying liquid, semi-liquid or granular material.

According to the present invention there is provided control apparatus in equipment for freeze-drying liquid, semi-liquid or granular material, the equipment comprising a vacuum-tight chamber, means for evacuating the chamber, and heating means for supplying heat to frozen material in the chamber, and the control apparatus comprising means for controlling the temperature of the heating means, during a freeze-drying operation, such that, after an initial heating-up of the material, the heat supplied by the heating means to frozen material being dried in the evacuated chamber maintains the temperature of a free surface of the material being dried at a substantially constant predetermined value.

For a better understanding of the present invention and to show how the same may be carried into effect, reference will now be made, by way of example, to the accompanying drawings, in which:

FIGURE 1 is a circuit diagram of control apparatus in a first form of equipment for freeze-drying liquid, semi-liquid or granular material, parts of the equipment also being shown, diagrammatically, and the circuit being shown in a condition corresponding to the control apparatus being switched off, FIGURE 2 is a graph showing variations of temperature with time, during a freeze-drying cycle in equipment similar to that of FIGURE 1, FIGURE 3 is a block diagram of control apparatus in a second form of freeze-drying equipment, and FIGURE 4 is a diagrammatic side view, partly broken away, of control apparatus in part of a third form of freeze-drying equipment.

The freeze-drying equipment of FIGURE 1 includes a vacuum-tight chamber 1 in which a plurality of trays 2 are removably disposed. The chamber 1 is provided with a door (not shown) through which the trays 2 can be passed into and removed from the chamber 1, the chamber 1 and the door being adapted so that there is a vacuum-tight seal between the chamber and the door when the door is shut. An outlet pipe, not shown, near the top of the chamber 1 connects the chamber 1, via a vacuum-tight compartment, to a vacuum pipe also not shown. The compartment contains condenser plates which are thus disposed between the trays 2 and the pump. Electrically heated heater plates 3 are fixed in the chamber so that each tray 2 has one p late 3 above it and one plate 3 below it. Each plate 3 is made up of two flat sheets having electrical heating elements 4 sandwiched therebetween, the elements 4 being insulated from the flat sheets. A first set of thermocouples 5 is associated with the heater plates 3 so that the current derived from the thermocouples 5 when the plates 3 are heated is proportional to the temperature of the plates 3. A second set of thermocouples 6 is associated with the trays 2 and these thermocouples 6 are placed, along with material 7 to be dried, in the trays 2 such that the current derived from the thermocouples 6 during drying of the material 7 is proportional to the temperature of the upper free surface 8 of the material 7 in each tray. The thermocouples 5 are connected in parallel to a single pair of compensating leads 9 to provide, in the leads 9, a signal that is proportional to the mean temperature of the plates 3. If desired, however, the thermocouples 5 can be connected in series to the leads 9. The thermocouples 6 are connected in parallel to a single pair of compensating leads 10 to provide, in the leads 10, a signal that is proportional to the mean surface temperature of the material 7 being dried. If desired, the thermocouples 6 can be connected in series to the leads 10. The leads 9 are connected to input terminals 11 of a first temperature controller indicator 12. The leads 10 are likewise connected to input terminals 13 of a second temperature controller indicator 14. The controllers 12, 14 are connected to A.C. supply lines 15, 16 and each controller 12, 14 has an earth line 17.

Each of the controllers 12, 14 has an indicator pointer, not shown, actuated by a galvanometer also not shown to which the input terminals 11 or 13 are connected. The pointer co-operates with a scale, not shown, as does a control arm also not shown of the controller 12 or 14. The scale is calibrated in degrees of temperature and the control arm can be set, by reference to the scale, in the case of the controller 12 to a maximum temperature which it is desired the mean temperature of the heater plates 3 should reach, and in the case of the controller 14 to a maximum temperature which it is desired the mean temperature of the surfaces 8 of the material 7 in the trays 2 should reach. The control arm carries a photo-sensitive transistor, an optical lens and a light source. When the light source illuminates the transistor, current is fed to an amplifier. The output of this amplifier energises a relay (not shown). This relay is thus energised whenever light passing through the lens from the source falls on the transistor. The relay of the controller 12 is arranged to actuate a moving contact 18 which closes on a contact 19 of the controller 12 when the relay is de-energised and on a contact 20 when the relay is energised. The relay of the controller 14 is arranged to actuate a moving contact 21 which closes on a contact 22 of the controller 14 when the relay is de-energised and on a contact 23 when the relay is energised. The indicator pointer of each controller 12, 14 carries a shutter (not shown) that can pass between the light source and the photo-sensitive transistor of the controller to cut off the beam of light falling on the transistor so that the relay of the controller is de-energised when the pointer is at the graduation on the scale to which the control arm is set. Preferably each controller includes a known resistance/capacitance circuit for minimising hunting of the indicator pointer about the graduation against which the control arm is set.

The contact 20 of the controller 12 is connected, via a normally closed contact 24A of a relay 24, to one side of a relay 25 the other side of which is connected to the supply line 16. The relay 25 has normally open contacts 25A′, 25A″, 25B which connect, when closed and in conjunction with a closed contact 26A″ of a relay 26, the heating elements 4 of the heater plates 3, in parallel, to the supply lines 15, 16. The contact 19 of the controller 12 is not used.

The contact 21 of the controller 14 is connected, via a normally open contact 24B of the relay 24, to one side of the relay 26 the other side of which is connected to the supply line 16. The relay 26 has a normally open contact 26A′ which connects, when it is closed and the normally closed contact 26A″ is open (and providing the contacts 25A′, 25A″ and 25B are open), the heating elements 4 of the heater plates 3, in series, to the supply lines 15, 16. The contact 22 of the controller 14 is connected, via a normally open contact 27A of a time delay relay 27, to one side of the relay 24 and also, via a normally open contact 24C of the relay 24, to one side of the time delay relay 27, the other sides of the relays 24, 27 being connected to the line 16. Said one side of the time delay relay 27 is also connected to the supply line 15.

With frozen material 7 that is to be dried in the trays 2, and with the chamber 1 evacuated to a very low pressure (e.g. 0.15 mm. Hg absolute), the equipment is operated as follows. Heat of sublimation is supplied to the frozen material 7 from the heater plates 3, the water present in the material 7 as ice being driven off as vapour without passing through the liquid phase. The pump is run continuously to maintain the vacuum in the chamber 1 and draw off the water vapour which condenses to ice on the condenser plates. As drying proceeds the temperature of the surface 8 of the material 7 in each tray 2 tends to rise and the control apparatus in the equipment acts as described later to cause the mean temperature of the heater plates 3 to drop as drying proceeds and to cause the mean temperature of the surfaces 8 of the material 7 in all the trays 2 to be maintained at a constant desired level. The control apparatus operates as follows. When the equipment is not in use the moving contacts 18, 21 of the controllers 12, 14 respectively make contact on the contacts 19 and 22. The contact arms of the controllers 12, 14 are set, the arm of the controller 12 to the maximum mean temperature which it is desired the heater plates 3 should reach, and the arm of the controller 14 to the maximum temperature which it is desired the mean temperature of the surfaces 8 of the material 7 in all the trays 2 should reach. Upon switching on the equipment by means of a switch not shown, the light sources of the controllers 12, 14 are illuminated and the time delay relay 27 is energised. The light from said sources falls on the photo-transistors causing a current to flow and thereby causing the relays of the controllers 12, 14 to be energised. The time taken for the relays of the controllers 12, 14 to operate produces a delay, i.e. a "warming-up" time. During this "warming-up" time the contact 27A is open. The time delay relay 27 is set to close the contact 27A after a period of time sufficient for the controllers 12, 14 to warm up has elapsed, for example approximately 10 seconds. When the controllers 12, 14 have warmed-up their relays become energised and their moving contacts 18, 21 are actuated by the relays to close, respectively, on the contacts 20 and 23. With the moving contacts 18, 21 in these respective positions, the relays 24 and 26 are de-energised whilst the relay 25 is energised and closes its contacts 25A', 25A" and 25B. The elements 4 are therefore connected to the supply lines 15, 16 in parallel and the heater plates 3 heat up. As the plates 3 heat up the signal passed to the controller 12 from the thermocouples 5 causes the indicator pointer of the controller 12 to move towards the control arm of the controller 12, the control arm it will be recalled having been set to the maximum mean temperature (e.g. 140° C.) which it is desired the plates 3 should reach. As the indicator pointer approaches the control arm the resistance/capacitance circuit becomes operative so that the relay 25 is alternately de-energised and energised. The contacts 25A', 25A", 25B therefore alternately open and close so that the rate at which the temperature of the heater plates 3 rises slows down as the plates 3 approach their maximum mean temperature. When the heater plates 3 reach this maximum mean temperature the shutter carried by the indicator pointer cuts off the light beam falling on the photo-transistor mounted on the control arm and the relay of the controller 12 becomes continuously de-energised so that the moving contact 18 moves from the contact 20 to remain on the contact 19 and the supply of current to the elements 4 is cut off. Since the current supply to the elements 4 is cut off the plates 3 cool down and the signal passed to the controller 12 from the thermocouples 5 causes the indicator pointer to move away from the control arm. Light therefore again passes from the light source to the photo-transistor, the relay of the controller 12 is re-energised, and the moving contact 18 moves back onto the contact 20. The relay 25 therefore becomes energised again and closes its contacts 25A', 25A", 25B so that current is again supplied to the elements 4. The heater plates 3 are thus maintained at their maximum mean temperature, the resistance/capacitance circuit tending to prevent undue fluctuations in the temperature of the plates 3.

Whilst the heater plates 3 are maintained at their maximum mean temperature the temperature at the surface 8 of the material 7 in each tray 2 rises and the signal passed to the controller 14 from the thermocouples 6 causes the indicator pointer of the controller 14 to move towards the control arm of the controller 14. As previously mentioned this control arm is set to the temperature (e.g., 60° C.) at which it is desired the mean temperature of the surfaces 8 of the material 7 in all the trays 2 should be maintained during drying. This temperature is chosen, in dependence upon the characteristics of the material 7, such that the heat applied to the material 7 to maintain this temperature is high enough satisfactorily to dry the material without being so high as to burn the material or to thaw to liquid any of the water present as ice in the material 7. When the surfaces 8 reach this mean temperature the shutter carried by the indicator pointer of the controller 14 cuts off the beam of light falling upon the transistor carried by the control arm of this controller and the relay of the controller 14 is de-energised. The moving contact 21 therefore moves onto the contact 22 and since the contact 27A of the relay 27 is closed the relay 24 becomes energised. The contact 24A therefore opens and the contacts 24B and 24C close. Due to the closure of the contact 24C the relay 24 becomes self-energising. Since the contact 24A is open the relay 25 becomes de-energised and its contacts 25A', 25A", 25B open. The current supply to the elements 4 is therefore cut off and the heater plates 3 begin to cool. Since the plates 3 begin to cool the mean temperature of the surfaces 8 of the material 7 in the trays 2 also drops and the indicator pointer of the controller 14 moves away from the control arm of this controller so that light again falls on the photo-transistor and the relay of the controller 14 becomes energised to move the moving contact 21 onto the contact 23. Contact 24B is closed, so the relay 26 is energised and closes its contact 26A', contact 26A" opening. Due to the closing of the contact 26A' and the opening of the contact 26A" the elements 4 are connected, in series, to the supply lines 15, 16 and the temperature of the heater plates 3 begins to rise again. The rise in the temperature of the heater plates 3 results in a rise in the mean temperature of the surfaces 8 of the material 7 in the trays 2 so that the relay of the controller 14 again becomes de-energised and the supply of current to the elements 4 is again cut off. The controller 14 continues to control the temperature of the heater plates 3, as drying continues, so that the mean temperature of the surfaces 8 remain constant. The controller 12 has no further controlling effect on the temperature of the plates 3.

When the material 7 is sufficiently dry the equipment is switched off. This switching off can be effected by a timer set for a desired length of time. Alternatively a further, third set of thermocouples or temperature sensing means is used as shown in FIGURE 1, such thermocouples 6' are embedded in the material 7 so as to obtain a signal corresponding to the mean temperature prevailing deep in the material. These thermocouples 6' are connected to a further or third temperature controller 12' by leads 10', as shown in FIGURE 1, arranged to switch off the equipment when the mean temperature deep in the material is very near to the surface temperature.

The third controller 12' is interposed between the supply line 15 and the controllers 12, 14 and time delay relay 27. The connections between the supply line 15 and the controller 14 and relay 27, shown in FIGURE 1, being omitted when the third controller 12' is included in the circuit. A relay of the third controller 12' is arranged to actuate a movable contact 18' of the controller which closes on a contact 19' of the controller when the relay is energised. In other respects the third controller 12' is similar to the first controller 12. The contact 20' of the third controller 12' is connected to the first and second controllers 12 and 14, the time delay relay 27, and the supply line 16 via a relay 25'. The contact 19' is not used. A normally open (and preferably spring biased) manually operated switch S1 is provided in the connection between the third controller 12' and the supply line 16, and is employed to switch the equipment on. A normally open switch S2 of the relay 25' is connected in parallel with the switch S1.

In operation of the equipment when the third controller 12' is utilized, the switch S1 is closed for a short period, sufficient for the relay of the third controller 12' to become energised, thereby connecting the first and second controllers 12 and 14, and relays 27 and 25', to the supply lines. The energising of the relay 25' causes the switch S2 to close so that the switch S1 may be open without thereby causing the third controller 12' to be disconnected from the supply line 16. Operation of the equipment then proceeds, as already described, until the predetermined 'deep-food' temperature is reached at which the signal, passed to the third controller 12', from the thermocouples 6', within the material being dried, causes the relay of the third controller 12' to become de-energised, thereby cutting off the power supply to the first and second controllers 12, 14 and relays 27 and 25'. The resultant de-energising of the relay 25' allows the switch S2 to open so that the power supply to the third controller 12' is also cut off. This arrangement ensures that the equipment is rendered inoperative after the temperature within the material has reached a preset value.

Instead of switching off the equipment when the mean temperature deep in the material being dried is very near the surface temperature, the mentioned controller 12' can be operated to initiate a further period of drying, this further period being maintained for a specific length of time. Such a further period of drying can be utilised to remove traces of moisture which may remain in the material. In the equipment provided with only two controllers, such a further drying period can be obtained with the use of suitable timers, or by manually controlling the temperature of the heater plates 3. If desired auxiliary heaters other than the heater plates 3 can be provided for heating the material 7 during the further drying period.

The structures of certain materials are more resistant than others to the flow of vapour through them and some materials are so resistant that during a freeze-drying operation the pressure of vapour within the material builds up to a value sufficiently high to bring about thawing of the ice present in the material. Such thawing damages the material. When a material is to be dried in connection with which it is known that thawing such as has just been described is liable to take place, a controller is provided which is connected to thermocouples embedded deep in the material. This controller is arranged to cut off the supply of current to the elements 4 of the heater plates 3 if the mean temperature deep in the material begins to rise earlier than desired during a freeze-drying operation. The desired time at which the mean temperature deep in the material should rise, i.e., when the material is sufficiently dry throughout, is known since the characteristics of the material are known. The last-mentioned controller is arranged to re-connect the current supply to the elements 4 to continue the drying operation when the mean temperature deep in the material falls again. This last-mentioned controller continues to override the controller 14 whenever necessary during the freeze-drying operation until said desired time is reached and the operation terminated.

FIGURE 2 relates to equipment similar to that shown in FIGURE 1 but having, in addition to the thermocouples 5 giving, during operation, signals corresponding to the mean temperature of the heater plates, and the thermocouples 6 giving the mean temperature of the surfaces of the material being dried, further thermocouples giving the mean temperature deep in the material. The figure shows the variation in each of these temperatures which occurs during a typical drying cycle. In the figure, temperature in degrees centigrade is plotted as ordinate against time in hours as abscissa. Curve 28 corresponds to the variations of the mean temperature of the heater plates with time curve 29 corresponds to the mean surface temperature of the material being dried and curve 30 corresponds to the mean temperature deep in the material being dried. In the particular drying cycle shown, the control arm of the controller 12 is set to give a maximum mean heater plate temperature of 150°, and it will be noted that this temperature is reached one hour after the commencement of the drying cycle. The control arm of the controller 14 is set to give a maximum mean material free surface temperature of 60° C. This temperature is reached one and a half hours after the commencement of the drying cycle. The mean temperature deep in the material becomes very near to that at the free surface of the material, indicating that drying is complete, ten hours after commencement of the drying cycle.

Instead of switching the heating elements 4 of the plates 3 on and off, the controllers 12, 12' and 14 can be arranged to energise D.C. control windings of saturable reactors connected to the elements 4. Alternatively, the controllers 12, 12' and 14 can be arranged to actuate variable resistances in series with the elements 4, or to control motor driven variable transformers.

The thermocouples that have been described can be replaced by thermobulbs, that is by a coil of wire in a bulb, the electrical resistance of this coil varying with variations in the temperature of the thermobulb's surroundings.

In place of the electrically heated plates which have so far been described, plates heated by circulating liquid therethrough can be utilised. Such plates are formed of two flat sheets having grooves therein, the grooves of one sheet corresponding to the grooves of the other sheet. The sheets are secured together so that the grooves of one sheet register with the grooves of the other sheet to form liquid-tight channels within the heater plate. Equipment provided with liquid-heated plates has a pump arranged to circulate liquid from a tank to the plates and back to the tank. The tank is provided with immersion heaters controlled by controllers corresponding to the controllers 12, 14. Before commencing a drying process using such equipment, the liquid in the tank is heated to a desired temperature and drying is then commenced. The pump is run at a constant speed so as to produce a constant flow of liquid through the plates, the temperature of the liquid flowing through the plates being controlled by the controllers in a manner corresponding to the manner already described, the controllers controlling the temperature of the immersion heaters in the tank.

The form of freeze-drying equipment of FIGURE 3 has liquid-heated plates 3A that take the place of the plates 3 already described, only two of these plates being shown. In this form, however, the liquid circulated through the plates 3A is heated by steam, transfer of heat from the steam to the liquid being effected in a heat exchanger 31. This form of equipment has thermocouples 6A, only one of which is shown, for providing a signal proportional to the mean temperature of the upper free surfaces 8 of the material 7 in each tray 2 (only one tray 2 being shown in FIGURE 3). The compensating leads 10A of the thermocouples 6A are connected to a controller/recorder 32. This controller/recorder 32 can be "set" to a temperature at which it is desired the mean temperature of the surfaces 8 of the material 7 in the trays 2 should be maintained during drying, the temperature to which the recorder is set being indicated on a scale 32A. Such setting of the controller/recorder 32 causes an out-of-balance condition to be sensed by a measuring circuit of the controller/recorder 32 whenever, during drying, the mean temperature of the upper free surfaces 8 differs from the temperature to which the controller/recorder 32 has been set. To this end, the controller/recorder 32 has a pen that co-operates with a chart. The chart is driven past the pen when the controller/recorder 32 is operated and the pen is arranged to move, transverse to the direction of movement of the chart, in accordance with the signals fed to the controller/recorder 32 from the thermocouples 6A. The pen is connected to a sliding contact of a proportioning resistor, included in the measuring circuit of the controller/recorder 32, to move the sliding contact in accordance with the signals from the thermocouples 6A. The controller/recorder 32 is connected to a 3-term controller 33 via a lead 33A. If there is a difference between the mean temperature of the upper free surfaces 8 and the temperature to which the controller/recorder 32 has been set, the proportioning resistor of the controller/recorder 32 feeds an output signal, which is an "error" signal proportional to the difference, to the controller 33 via the lead 33A. The controller 33 combines proportional, integral and derivative control action, the controller 33 being arranged to actuate, via a lead 33B, the motor 34A of a motor-driven valve 34 that controls the input of steam to the heat exchanger 31. A proportioning resistor similar to that of the controller/recorder 32 is associated with the motor that drives the valve 34, the sliding contact of this last-mentioned resistor moving with the shaft of the motor. The output signal, which constitutes a "feed-back" signal, of this proportioning resistor is also fed, via a lead 33C, to the controller 33.

Before drying of the material 7 in the equipment of FIGURE 3, the controller/recorder 32 is set to the temperature at which it is desired the mean temperature of the surfaces 8 of the material 7 should be maintained during drying. During drying a signal proportional to the mean temperature of the material surfaces 8 is fed from the thermocouples 6A, to the controller/recorder 32 and the pen of the controller/recorder 32 produces a record of the mean temperature as a continuous line on the moving chart. Whenever there is a difference between the actual mean temperature of the material surfaces 8 and the set temperature, the controller 33 receives an error signal from the proportioning resistor of the controller/recorder 32, and the controller 33 causes the motor to adjust the valve 34 in the direction to reduce this error signal to zero. In practice, an error signal is received at the commencement of a drying operation, the valve 34 opens fully, and the error signal reduces to zero after the plates 3A have heated up and the mean temperature of the surfaces 8 has reached the set temperature. The controller 33 also receives the feedback signal from the proportioning resistor associated with the motor that drives the valve 34 and, once the error signal has been reduced to zero, the controller 33 causes the motor to adjust the valve 34, in dependence upon the feed-back signal, in the direction to maintain the error signal at zero. The controller 33 thus controls the valve 34 to heat the plates 3A so that the mean temperature of the material surfaces 8 attains, and is maintained at, the desired value. The control action applied by the controller 33 to the valve 34 is dependent upon (i) the deviation between the desired mean surface temperature of the material 7 and the actual mean surface temperature of the material 7, measured by the thermocouples 6A (proportional control action), (ii) the rate of change of this deviation (derivative control action), and (iii) the integral of the deviation (integral control action). A controller corresponding to the controller 12 for limiting the mean temperature of the plates 3A is omitted since the temperature that the plates 3A can reach is limited by the maximum temperature obtained by the steam input to the heat exchanger 31. This steam temperature is proportional to the pressure of the steam and steam relief valves, not shown, are provided for ensuring that the required pressure is not exceeded. As in the equipment of FIGURE 1, a controller receiving signals from thermocouples disposed deep in the material 7 can be provided for terminating a drying process. Alternatively such thermocouples can be used to give a warning that the temperature of the material 7 is such that the freeze-drying process should be terminated and the process can be terminated manually.

In further forms of equipment, not shown, in which heater plates corresponding either to the electrically-heated or the liquid-heated plates already described, are used, the controllers which have been described are replaced, in each case, by a single cam operated controller. This controller is similar to the controllers 12, 12' and 14 previously described except that the position of the control arm of the controller is not set manually but is set by a cam follower that co-operates with a cam, the profile of the cam determining the setting of the control arm at any instant during operation. The cam operated controller controls the mean temperature of the heater plates and is connected to a set of thermocouples corresponding to the set of thermocouples 5 previously described.

In operation the cam varies the position of the control arm as a drying operation proceeds so that, in dependence upon the signals received from the set of thermocouples, the controller maintains the mean temperature of the heater plates, after initial warming-up of the plates, at the temperature to which the position of the control arm corresponds at any instant. The profile of the cam is cut in accordance with the characteristics of the material to be dried as determined by previous tests. For example, the profile of the cam can be cut so that the position of the control arm varies during operation in a manner such that the controller controls the heater plates to cause the mean temperature of the plates to vary along the curve 28 of FIGURE 2 whereby the mean surface temperature of the material being dried remains constant as indicated by the curve 29 in FIGURE 2.

A cam-operated controller can be used in freeze-drying equipment such as has been described to control all the stages of a freeze-drying process. Thus, after the equipment has been initially switched on, the controller can start a refrigeration unit of the equipment to freeze material that is to be dried, start a vacuum pump to evacuate the freeze-drying chamber of the equipment, cause heating of the heater plates to commence, vary the setting of the control arm of the controller so that the controller causes the mean temperature of the heater plates to vary in a predetermined manner, terminate heating of the heating plates, introduce cooling water through the heat exchanger of the equipment (in the case of liquid-heated plates using steam as a heating medium), break the vacuum in the chamber by introducing inert gas into the chamber, and terminate the cycle.

The forms of freeze-drying equipment so far described have been for freeze-drying batches of material. The form of freeze-drying equipment, part of which is shown in FIGURE 4, is for continuous operation. This equipment has a vacuum-tight tunnel 35 with an air lock (not shown) at each end to allow entry and exit into and from the tunnel 35 without loss of vacuum in the tunnel. These air locks are provided with electrically or hydraulically operated doors. Stillages 36 mounted on wheels running on a track 36A carry trays, not shown, corresponding to the trays 2 already described through the tunnel 35. The stillages 36 also carry electrically heated heater plates 3B corresponding to the plates 3 already described. The freeze-drying tunnel 35 corresponds to the vacuum chamber 1 already described and is provided with evacuating pump and condensing units (not shown). Each stillage 36 moves stepwise through the tunnel 35 so as to stop in turn at a series of drying stations along the tunnel 35. A part of the process of drying material carried in the trays mounted on each stillage 36 takes place at each drying station, the drying process being terminated at the final drying station of the tunnel 35. The heater plates 3B are provided with thermocouples 5A and at each drying station the compensating leads 10A of these thermocouples 5A are connected by a make-and-break mechanism 37 to a cam-operated controller 38 similar to the cam-operated controllers already described. Power supply leads 39 of the heater plates 3B are also connected by the make-and-break mechanism 37 to supply lines 40. The make-and-break mechanism includes contacts 37A, 37B respectively connected to the controller 38 and to the supply lines 40. The contacts 37A, 37B are movable vertically to make contact with contacts 37A' and 37B' respectively, a pair of these contacts being carried by each stillage 36. The contact 37A' is connected to the leads 10A and the contact 37B' is connected to the leads 39. At each drying station the position of the control arm of the controller 38 at that station is varied by its cam so that a portion of the entire drying process is effected at that station. Overriding limit switches (not shown) are provided to ensure that each stage of the drying process is completed at each drying station before a stillage 36 is moved on to the next drying station.

The equipment that has been described can be used for freeze-drying foodstuffs and other liquid, semi-liquid or granular materials such as chemicals which are not foodstuffs.

What I claim is:

1. Control apparatus in equipment for freeze-drying liquid, semi-liquid, or granular material in a vacuum-tight chamber; the equipment including heating means heated by electrical heating elements for heating frozen material in the chamber; the control apparatus comprising a first temperature sensing means for sensing the temperature of said heating means, a first temperature controller operatively connected to this first temperature sensing means and to the heating means to receive, during a freeze-drying operation, a signal from the first temperature sensing means dependent upon the temperature of the heating means and to control this temperature in dependence upon said signal, during an initial heating-up of the frozen material in said chamber, so that the temperature of the heating means does not substantially exceed a desired maximum value which value is sufficiently high to ensure that the temperature of the free surface of the material being dried reaches a predetermined value; the control apparatus comprising a second temperature sensing means for sensing the free surface temperature of the material being dried in the chamber, a second temperature controller operatively connected to this second temperature sensing means and to the heating means to receive, during said freeze-drying operation, a signal from the second temperature sensing means dependent upon said free surface temperature and to control this temperature in dependence upon said signal so that the heat supplied by the heating means to the material being dried maintains the temperature of the free surface of the material, after said initial heating-up of the frozen material, substantially constant at said predetermined value; and the control apparatus further comprising an electric current supply, first and second switching means for connecting the electrical heating elements to the current supply, the first and second switching means being operatively connected to the first and second temperature controllers whereby, during said initial heating-up, the first switching means is rendered operative by the first temperature controller to connect the electric heating elements to the current supply until the temperature of the heating means reaches said desired maximum value, the first temperature controller thereafter rendering said first switching means alternately inoperative and operative to disconnect and connect the electric heating elements to the current supply to maintain the temperature of the heating means substantially at said desired maximum value, the first temperature controller exerting this control action until the free surface temperature of the material being dried reaches said predetermined value whereupon the second temperature controller renders said first switching means inoperative so that the first temperature controller has no further controlling effect on the temperature of the heating means, the second temperature controller thereafter rendering said second switching means alternately inoperative and operative to disconnect and connect the electric heating elements to the current supply to control the temperature of the heating means, whereby the heat supplied thereby to the material being dried maintains the free surface thereof at said substantially constant predetermined value.

2. Control apparatus as claimed in claim 1, wherein the apparatus also includes third temperature sensing means for sensing the temperature within the material being dried, and a third temperature controller operatively connected to this third temperature sensing means and to said equipment to receive, during said freeze-drying operation, a signal from the third temperature sensing means and, after the temperature within the material has reached a pre-set value, to render the equipment inoperative.

3. Control apparatus as claimed in claim 2, wherein the third temperature sensing means is a set of thermocouples, the thermocouples of the set being connected in parallel to leads connected to the temperature controller associated with the set of thermocouples.

4. Control apparatus as claimed in claim 1, wherein the apparatus also includes third temperature sensing means for sensing the temperature within the material being dried, and a third temperature controller operatively connected to this third temperature sensing means and to said equipment to receive, during said freeze-drying operation, a signal from the third temperature sensing means and, after the temperature within the material has reached a pre-set value, to maintain the heating means operative independently of the first and second controllers for a predetermined period of time and thereafter render the equipment inoperative.

5. Control apparatus as claimed in claim 1, wherein the apparatus further includes a further temperature sensing means for sensing the temperature within the material being dried, and a further temperature controller operatively connected to this further temperature sensing means and to the heating means to receive, during said freeze-drying operation, a signal from the further temperature sensing means and, if the temperature within the material reaches an undesirably high value during drying, to override the action of any other temperature controller and cut off the supply of heat from the heating means to the material until the temperature within the material drops again.

6. Control apparatus as claimed in claim 5, wherein the further temperature sensing means is a set of thermocouples, the thermocouples of the set being connected in parallel to leads connected to the temperature controller associated with the set of thermocouples.

7. Control apparatus as claimed in claim 1, wherein each temperature sensing means is a set of thermocouples, the thermocouples of each set being connected in parallel to leads connected to the temperature controller associated with the set of thermocouples.

8. Control apparatus as claimed in claim 1, wherein the first switching means, when operative, connect the elements in parallel to the current supply, and wherein the second switching means, when operative, connect the elements in series to the current supply.

9. Control apparatus as claimed in claim 1, wherein the heating means are heater plates having said elements embedded therein.

10. Control apparatus as claimed in claim 1, wherein the heating means are liquid-heated plates, the equipment further comprising a liquid storage tank, a pump for circulating liquid from the tank to the plates and back to the tank, and immersion heaters provided in the tank, the immersion heaters being heated by said elements.

References Cited

UNITED STATES PATENTS

| | | | |
|---|---|---|---|
| 3,132,930 | 5/1964 | Abbott et al. | 34—5 |
| 3,169,049 | 2/1965 | Rey | 34—5 |
| 3,178,829 | 5/1965 | Cox | 34—5 |
| 3,192,643 | 7/1965 | Rieutord | 34—5 |

FREDERICK L. MATTESON, JR., *Primary Examiner.*

JOHN J. CAMBY, *Examiner.*